United States Patent
Flotte et al.

(10) Patent No.: US 8,249,762 B1
(45) Date of Patent: Aug. 21, 2012

(54) DEVICE AND METHOD FOR MONITORING THE OBSTRUCTIONS IN THE CLOSE ENVIRONMENT OF AN AIRCRAFT

(75) Inventors: Laurent Flotte, Aurade (FR); Nicholas Marty, Saint Sauveur (FR); Pascal Gayraud, Toulouse (FR)

(73) Assignee: Thales, Neuilly sur Seine (FR)

( * ) Notice: Subject to any disclaimer, the term of this patent is extended or adjusted under 35 U.S.C. 154(b) by 418 days.

(21) Appl. No.: 12/478,367

(22) Filed: Jun. 4, 2009

(30) Foreign Application Priority Data

Jun. 10, 2008 (FR) ................................. 08 03215

(51) Int. Cl.
*G01C 5/00* (2006.01)
(52) U.S. Cl. ................................. 701/9; 701/3
(58) Field of Classification Search .................. 701/9, 1,
701/3, 4, 7, 14, 17, 301, 207, 208, 210, 214,
701/300, 302; 340/436, 945, 946, 961, 963;
342/29, 36
See application file for complete search history.

(56) References Cited

U.S. PATENT DOCUMENTS

| | | | |
|---|---|---|---|
| 5,488,563 A | 1/1996 | Chazelle et al. | |
| 5,892,462 A | 4/1999 | Tran | |
| 7,463,183 B2 * | 12/2008 | Reich | 342/29 |
| 7,751,976 B2 * | 7/2010 | Matuska et al. | 701/301 |
| 7,786,900 B2 * | 8/2010 | Bitar et al. | 340/976 |
| 7,881,866 B2 * | 2/2011 | Meunier et al. | 701/301 |
| 2003/0107499 A1 | 6/2003 | Lepere et al. | |
| 2005/0113985 A1 * | 5/2005 | Greene | 701/9 |
| 2006/0286829 A1 * | 12/2006 | Kim et al. | 439/81 |
| 2007/0031007 A1 | 2/2007 | Bitar | |
| 2007/0055418 A1 * | 3/2007 | Pire et al. | 701/14 |
| 2007/0086657 A1 | 4/2007 | Harder et al. | |
| 2007/0150117 A1 | 6/2007 | Bitar et al. | |
| 2007/0174005 A1 | 7/2007 | Bitar et al. | |
| 2007/0187554 A1 | 8/2007 | Bitar et al. | |

(Continued)

FOREIGN PATENT DOCUMENTS

EP 0565399 B1 10/1993

(Continued)

OTHER PUBLICATIONS

U.S. Appl. No. 11/683,989, filed Mar. 8, 2007.

(Continued)

*Primary Examiner* — Thomas G. Black
*Assistant Examiner* — Marthe Marc-Coleman
(74) *Attorney, Agent, or Firm* — Stroock & Stroock & Lavan LLP

(57) ABSTRACT

The invention relates to a device for monitoring obstructions for an aircraft including data storage, an anticollision device and viewing devices, wherein the monitoring device comprises a detector to detect in real-time obstructions, of terrain type and of human constructions type, in a close environment of the aircraft in a flight situation, a sensor to identify the obstructions at risk calculating identification parameters, a circuit to calculate criticality of the obstructions, a display to display both the obstructions with the identification and criticality parameters of the obstructions, and a generator of alerts to describe the situation according to a combination of the identification and criticality parameters. One or more embodiments of the invention is a monitoring system adapted for zones close to the aircraft and in the flight zones not visible to the crew. One or more embodiments of the invention applies particularly to helicopters executing low-altitude flights. It relates more particularly to military carriers such as rescue carriers.

10 Claims, 4 Drawing Sheets

U.S. PATENT DOCUMENTS

| | | |
|---|---|---|
| 2007/0219705 A1 | 9/2007 | Bitar et al. |
| 2007/0250223 A1 | 10/2007 | Francois et al. |
| 2007/0285283 A1 | 12/2007 | Bitar et al. |
| 2008/0004801 A1 | 1/2008 | Bitar et al. |
| 2008/0039984 A1 | 2/2008 | Bitar et al. |
| 2008/0046171 A1 | 2/2008 | Bitar et al. |
| 2008/0174454 A1 | 7/2008 | Bitar et al. |
| 2008/0243383 A1 | 10/2008 | Lin |
| 2008/0288169 A1 | 11/2008 | Meunier et al. |
| 2008/0306639 A1 | 12/2008 | Fleury et al. |
| 2008/0306680 A1 | 12/2008 | Marty et al. |
| 2008/0306691 A1 | 12/2008 | Louis et al. |
| 2009/0082954 A1* | 3/2009 | Ridenour, II ............... 701/206 |
| 2009/0125236 A1 | 5/2009 | Fontaine et al. |
| 2009/0132103 A1 | 5/2009 | Marty et al. |
| 2009/0138145 A1 | 5/2009 | Meunier et al. |
| 2009/0157241 A1 | 6/2009 | Meunier et al. |
| 2009/0265088 A1* | 10/2009 | Dias et al. ............... 701/301 |

FOREIGN PATENT DOCUMENTS

| | | |
|---|---|---|
| EP | 1726973 A | 11/2006 |
| EP | 1770595 A | 4/2007 |
| GB | 2408492 A | 6/2005 |
| WO | 2008031723 A1 | 3/2008 |

OTHER PUBLICATIONS

U.S. Appl. No. 12/118,129, filed May 8, 2008.

* cited by examiner

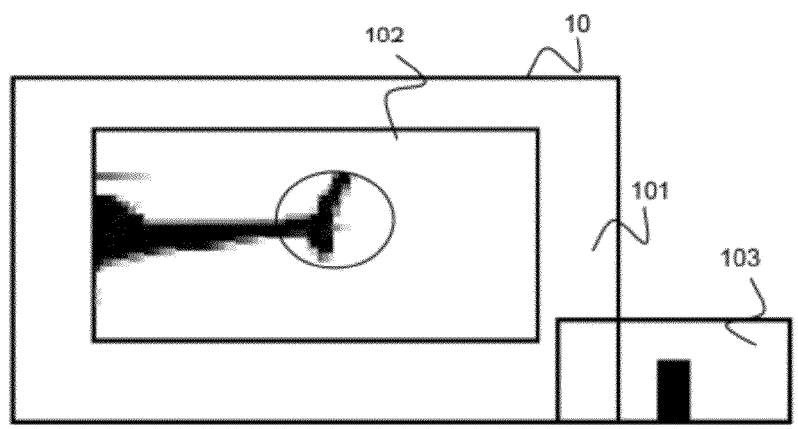
Fig. 3
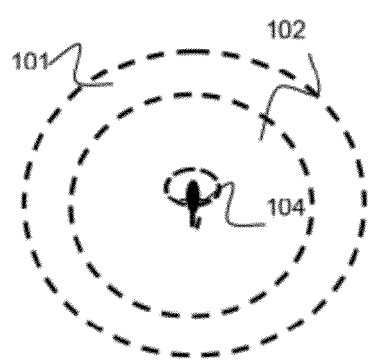 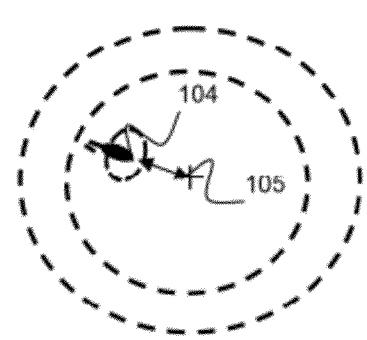
Fig. 4a    Fig. 4b

DEVICE AND METHOD FOR MONITORING THE OBSTRUCTIONS IN THE CLOSE ENVIRONMENT OF AN AIRCRAFT

CROSS-REFERENCE TO RELATED APPLICATION

The present application claims the benefit of French patent application Ser. No. 08/03215, filed Jun. 10, 2008, which is hereby incorporated by reference in its entirety.

FIELD OF THE INVENTION

The invention relates to the field of aerial navigation aids for the prevention of accidents in which an aircraft which is still maneuverable collides with an obstacle. Hereinafter, the term "obstacle" designates any non-natural obstruction present in the environment of the aircraft, and one then speaks notably of human constructions such as buildings or bridges. Moreover, the term "relief" or "terrain" designates obstructions relating to the natural environment such as mountainous zones and more generally the ground.

Through the type of missions carried out, landing and takeoff in zones that are difficult to access, sometimes unprepared, or low-altitude flight, the helicopter, for example, is a craft that is very highly exposed to the risk of colliding with obstacles situated in its close environment. In particular, the anti-torque device situated on the tail of the craft is a critical element for flight control, its loss leading almost irretrievably to the loss of the craft. Moreover, unlike the front part of the craft, it is difficult for the pilot to exactly perceive the actual position of the tail of the craft with respect to his environment. It is therefore a sensitive zone that is particularly prone to collisions.

BACKGROUND OF THE INVENTION

The person skilled in the art is familiar with systems of TAWS type, "Terrain Awareness and Warning System". The aim of these systems is to generate an alert when the aircraft is in a dangerous situation where the operational margins are no longer complied with. TAWSs in the guise of autonomous computer or computer integrated with the functions of TCAS, standing for "Traffic Collision Avoidance System", and WXR standing for "Weather Band X Radar", in an ISS, "Integrated Surveillance System", fulfil a primary function of terrain anticollision monitoring ("Safety Net") and are aimed at emitting audible alerts during an exceptional approach to the relief allowing the crew to react by engaging a vertical resource before it is too late. Accordingly, TAWS systems, decoupled from navigation systems, proceed in two ways. They periodically compare the theoretical trajectory that would be described by the aircraft during a resource and compare it with a section of the terrain and with the obstacles overflown obtained from a digital model of the world or local terrain embedded aboard the computer. Or else, certain TAWSs also integrate modes termed "reactive modes" which, by periodically comparing certain of the current parameters of the craft, for example the radio-altitude and the vertical speed, various charts determine whether the current situation of the aircraft is a normal situation or whether it is potentially dangerous. In the latter case, an alert, limited to a verbal message, is generated to inform the crew. The availability of a terrain model permits functions making it possible to improve the crew's situation perception. Among them, the objective of the alert lines is to delimit the terrain zones for which a TAWS alert might occur. For their part, the "Alert Areas" show the zones causing a TAWS alert. Numerous patent documents describe this type of system. Among them may be cited patent "EP0 565399B1" describing all the basic concepts of TAWSs and patent application "US2003/0107499A1" describing a device for displaying the terrain risk zones capable of causing a TAWS alert.

Helicopter laser radar systems ("HELLAS") can fulfill a function of protecting against collisions between the craft and an obstacle, high-voltage lines for example, by preventing the aircraft from approaching too closely. They proceed by scanning the zone situated at the front of the craft by means of a laser beam invisible to the naked eye. Potential obstacles encountered are presented to the pilot via a cockpit display. An audio alert is optionally generated when the craft is considered to be too close to the obstacle.

Flight Control Systems can fulfil a function of protecting against collisions between the tail of the craft and the ground by preventing the aircraft from having an attitude, in terms of posture, such that the tail of the craft can enter with the ground. They proceed by comparing the attitude of the aircraft and the speed at which it is approaching the ground with the remaining height as well as with a predefined margin. If the various elements are not compatible, a corrective action is undertaken by the system on the controls of the craft.

The essential purpose of systems of TAWS type is to protect the craft during cruising flight. Cases of collision between the craft and an arbitrary obstruction usually occur during the takeoff or landing phases—phases during which the TAWS alert functions are disabled, or in the best of cases, with a sensitivity that is reduced so much that the alert will be delivered too late to save the craft and more particularly the anti-torque device situated on the tail of the helicopter. Certain systems of TAWS type integrate additional protection functions, such as for example a function for protecting the tail of the craft, but they take no account of obstacles situated laterally or to the rear of the craft. Only the relief situated under the craft is actually considered. Systems of TAWS type, through their use of a digital terrain model, are not capable of detecting mobile obstacles, such as terrestrial vehicles or other aircraft. The alert function of a TAWS system triggers a message destined for the crew as soon as a certain safety threshold is crossed. It does not make it possible to calculate or to picture the discrepancy with respect to this threshold.

The systems of "HELLAS" type are complex and expensive. Their purpose is essentially aimed at military use and they are generally intended for the detection of obstacles of high-voltage cable type in the cruising phase while flying at low or very low altitude. These systems do not generally make it possible to protect the lateral parts and the tailplane of the craft.

The systems of flight control type are also complex and expensive and rely on the possibility offered to them of acting on the control surfaces of the craft. Not all helicopters may be so equipped. Moreover these systems, through their corrective action, do not allow the crew to anticipate the situation. They likewise do not make it possible to protect the lateral parts or the front of the craft and they offer reliable protection only in relation to the ground or obstacles situated under the craft. They do not protect the craft in relation to mobile obstacles.

SUMMARY OF THE INVENTION

The aim of the invention is the improving of safety in situations where the helicopter operates with low lateral and vertical separation margins with respect to fixed or mobile artificial obstacles situated nearby. The aim of the innovation is to present to the crew the situation of the these various elements with respect to that of the aircraft and to produce an alert when the margins are no longer sufficient, so as to allow the crew time to react before the situation becomes critical.

More precisely, the invention is a device for monitoring obstructions for an aircraft including data storage, and viewing devices, characterized in that the monitoring device includes a real-time detection of obstructions, of terrain type and of human constructions type, in the close environment of the aircraft in a flight situation, means for identifying the obstructions at risk calculating identification parameters, means for calculating criticality of the obstructions, combined means for displaying the obstructions with the identification and criticality parameters of the obstructions on the viewing devices and means for audible and visual generation of the alerts describing the situation according to a combination of the said identification and criticality parameters, these parameters characterizing the nature, the location and the dimension of the obstructions, the direction and the speed of displacement (i.e., speed of travel) of the obstructions and the value of and the variation in the distance between the aircraft and the obstructions.

The invention is advantageous in that it makes it possible to reduce stress to the crew by allowing the crew to avoid entering dangerous situations or by reducing the surprise effect if such a situation arises. It makes it possible notably to afford the crew a synthetic depiction of the close environment of the aircraft at the level of the non-visible zones and also to describe the behaviour of the elements present in this environment. The device according to the invention includes a real-time detection of obstructions at risk and their displacement with respect to the aircraft so as to provide relevant information to the crew allowing them to take the right piloting decisions in the immediate instant. Flight safety is thus greatly improved thereby.

BRIEF DESCRIPTION OF THE DRAWINGS

The invention will be better understood and other advantages will become apparent on reading the nonlimiting description which follows and by virtue of the appended figures among which:

FIG. 3 illustrates the method of detecting obstructions and their criticality level.

FIGS. 4a and 4b illustrate the method of calculation for defining the location of the risk zones in the environment of the aircraft.

DETAILED DESCRIPTION OF PREFERRED EMBODIMENT

The aim of the present invention is to make the systems cited hereinbelow collaborate, so as to present to the crew the obstacles and the terrain zones that are potentially dangerous for the craft in general. The monitoring device is arranged in such a way that it recovers the data originating from an active system for detecting obstacles and the relief based on short-range radar technology, such as terrain awareness and warning systems ("TAWS") for example, the data of a system of TAWS type making it possible to raise ad-hoc alerts should the craft approach dangerously near to a relief zone and/or obstacles, and that it transmits, to a display device in the cockpit, the information formulated by the system so as to present the said information to the crew.

The invention also relates to the method for monitoring obstructions for an aircraft, characterized in that detection means measure parameters for locating and identifying obstacles in the close environment of the aircraft, in that identification means calculate identification parameters defining the nature, the location and the dimension of the obstructions, the direction and the speed of displacement of the obstructions and the value of and the variation in the distance between the aircraft and the obstructions and in that these identification parameters are transmitted to calculation means making it possible to generate audible and visual alerts describing the location, the displacement and the criticality of the obstructions in the close environment of the aircraft.

Figure 1:
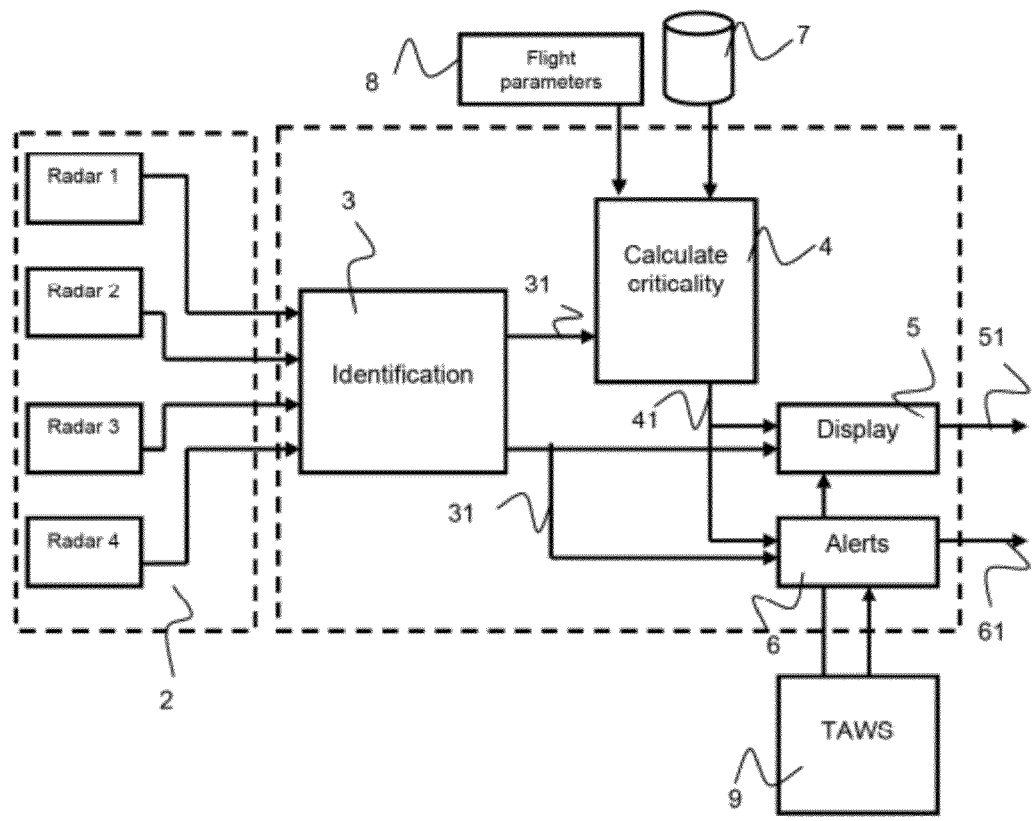
FIG. 1 represents a diagram summarizing the hardware and functional architecture of the monitoring device.
Figure 2:
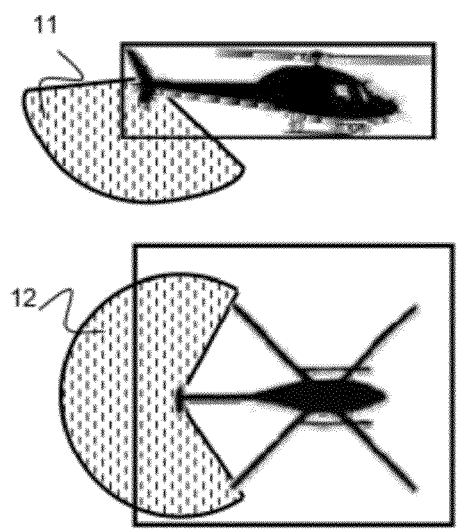
FIG. 2 represents the aircraft and the device's monitoring axes.

FIG. 1 represents a diagram of the monitoring device and the functions carried out by the invention. Advantageously, the means 2 for real-time detection of obstructions includes a plurality of short-range radar technology sensors installed on the fuselage of the aircraft in such a way that they make it possible to detect obstructions at the level of the lateral axis 12, of the vertical axis 11 and at the level of the rear axis 12 of the aircraft. The majority of the sensors are positioned underneath the craft, since this is an exposed part for a helicopter. The accuracy of the data is a critical factor for the implementation of the invention since all the calculations carried out by the monitoring device are based on the data produced by these sensors. This is why the underside of the craft includes most of the radars. Some of the sensors are nevertheless installed on the sides of the fuselage, since the lateral axes are also exposed to obstructions.

Advantageously, the sensors are installed on the tail of the aircraft in such a way that they make it possible to detect obstructions at the level of the lateral axis, of the vertical axis and at the level of the rear axis of the aircraft. This is generally the most exposed part of a helicopter. These sensors are then positioned over the whole of the tail since the crew has no visibility on this part of the craft and the loss of this element would cause the loss of the craft.

In a mode of implementation, the monitoring device includes a plurality of sensors disposed on the fuselage as well as on the tail. The whole of the aircraft is thus covered by the monitoring device.

Advantageously, the monitoring device also includes a circuit to dynamically allocate a confidence coefficient of the data produced by each sensor. The detection means 3 measure the location and identification parameters on the basis of a plurality of sensors, and the identification means allocate each identification parameter 31 a confidence coefficient depending on the sensor that provided the datum, the confidence coefficient evolving as a function of the instantaneous flight parameters and of the measurement discrepancies between the sensors. On the basis of the various sensors installed on the aircraft, the monitoring device correlates each item of information received so as to determine the obstacles and the relief situated near the craft which could be potentially dangerous as a function of the margins to be complied with. The correlation is performed by means of a mean weighted as a function of the uncertainty associated with each datum transmitted by a sensor. A bigger weight is accorded to the most accurate measurements while a lower weight is associated with the least accurate measurements. The weighting coefficients used are therefore variable, thereby making it possible for example to take sensors into account differently depending on their placement on the carrier or the type of technology used, which is more or less accurate as a function of the speed of displacement of the aircraft.

The identification means 3 is capable of determining all or some of the identification parameters 31 listed below for each obstacle and the relief. It is in charge of processing the raw information received from the sensor system so as to determine the parameters 31: position, height, vertical dimension, value of the speed, direction of displacement, bearing, distance gap between the obstruction and the craft, variation of the distance gap between the obstruction and the craft.

The means 4 for calculating criticality of the obstructions compares the rate of evolution of the distance separating the obstructions from the aircraft. For each of the data, an uncertainty percentage is then associated with the value measured by the radar. The calculation takes account of the evolution of the information received so as to anticipate the future movements of the craft as well as those of mobile obstacles.

Advantageously, the criticality calculation means 4 couples the identification parameters 31 of the obstructions with the instantaneous flight parameters 8 so as to calculate anticipated positions of the aircraft in order to evaluate the criticality level of the obstructions. In a more complex version of the monitoring device, the flight data 8 are combined with the information received from the radars making it possible to more finely anticipate the trajectory and the future altitude of the aircraft. The aim is to consider the obstructions tending to approach the craft or towards which the craft is tending or might tend as being more dangerous and to consider the obstructions moving away from the craft or from which the craft is moving away sufficiently rapidly as being less dangerous, or indeed inoffensive. The flight data originate from devices of inertial platform or FMS type for example, more generally any device capable of providing the instantaneous flight parameters.

FIG. 3 represents the method of calculating the criticality of the obstructions. Advantageously, the criticality calculation means 4 makes it possible to define an aircraft risk zone 10, the said aircraft risk zone is a volume centred on a part of the aircraft and including two zones each defining a different alert criticality level for the obstructions located in the said zones, the first zone 102 being a volume situated at the centre of the risk zone whose criticality level is the highest, called the "safety net warning", and the second zone 101 being the ring of the aircraft risk zone called the "safety net caution". The volumes defining the aircraft risk zones can be spheres, cubes or other geometric shapes.

Advantageously, the device also includes a database including a geometric description of the aircraft, the dimensions of the said zones (101, 102) are calculated as a function of data 7 providing the geometric description of the aircraft and flight margins and dynamic flight parameters 8 of the aircraft and the said zones are centered on a short-term anticipated location 105 of the part of the aircraft. The data 7 can be contained in databases or in navigation devices including configuration data for the aircraft. The use of a geometric description of the aircraft makes it possible to calculate dimensions of risk zones suited to each carrier. The accuracy of the information provided is thus improved and makes it possible to avoid false alerts or to present alerts with a delay time. The flight parameters received correspond to the speed, the vertical speed and the radio altitude for example. The data of flight margins 7 are also configurable. The calculation scheme varies the size of the volume linearly as a function of the rate at which its distance varies with respect to the aircraft. These dimensions can also be configurable by the crew. In this configuration, the dimensions of the zones are then fixed.

FIGS. 4a and 4b represent the positioning of the risk zones according to the instantaneous flight parameters 8 of the aircraft. When the aircraft is stationary, the risk zones are centered on the craft 104. When the aircraft is moving, the risk zones are no longer centered on the craft 104 but on an anticipated location 105. The aircraft is a rotary-wing aircraft or one capable of vertical landings and takeoffs, typically a helicopter, and advantageously, the said zones are centered on the anti-torque rotor or the vertical fin. The anti-torque rotor corresponds to the most critical part of the craft that is not visible, this is why the monitoring zone is focused on this element.

Advantageously, the criticality calculation means makes it possible to define an obstruction risk zone 103 and this zone is defined by the obstruction's dimensions increased by a volume whose dimensions are dependent on the speed of approach of the obstacle and an anticipation time. This method of calculation makes it possible to identify the obstructions that are most threatening for the craft. Indeed, an obstruction which has a tendency to move away from the craft, that is to say which exhibits a negative approach speed, is characterized by an obstruction risk zone exhibiting low dimensions. The volumes defining the obstruction risk zones can be spheres, cubes or other geometric shapes, these dimensions being dependent on the geometric shape of the obstructions defined in the databases. The shape of the obstruction risk zones, as well as the shape of the aircraft risk zones, do not in any way limit the spirit and the scope of the invention.

Advantageously, the alerts of each of the zones 101 and 102 are triggered as soon as the obstruction risk zone 103 penetrates the respective risk zones 101 and 102. In a more restrictive criticality calculation mode, the display of the obstructions and of the alerts is triggered as a function of the duration of the location of the obstruction risk zone inside the respective aircraft risk zones. The obstacle represented in FIG. 3 is considered to be threatening on account of the existence of a conflict between the obstruction risk zone 103 and the aircraft risk zone 10. An obstruction whose risk zone penetrates the aircraft risk zone but which remains there only momentarily, for a duration less than a predefined threshold, is not considered to be threatening.

The monitoring device is linked to an anticollision device of TAWS type, whose role is to protect the craft with regard to the obstructions in the cruising flight phase. Advantageously, the monitoring device according to the invention then also includes a means for merging a first type of data 31, 41, calculated by the monitoring device, and a second type of data, produced by the anticollision device 9, making it possible to display either solely the first type of data, or both types of data merged, or solely the second type of data, the display of the two types of data being linear, until one of the two types of data is disabled, favouring the data of the first type when the aircraft is located at low altitude and is moving at low speed, and favouring the data of the second type when the aircraft is located at high altitude and is moving at a high speed. The calculation means merges the information produced by the monitoring device according to the invention with that received by the device of TAWS type so as to present the most relevant interface of the method.

Advantageously, when the aircraft is located at low altitude and is moving at low speed, the monitoring device limits the display of the monitored zone to a zone close to the aircraft.

Figure 5:
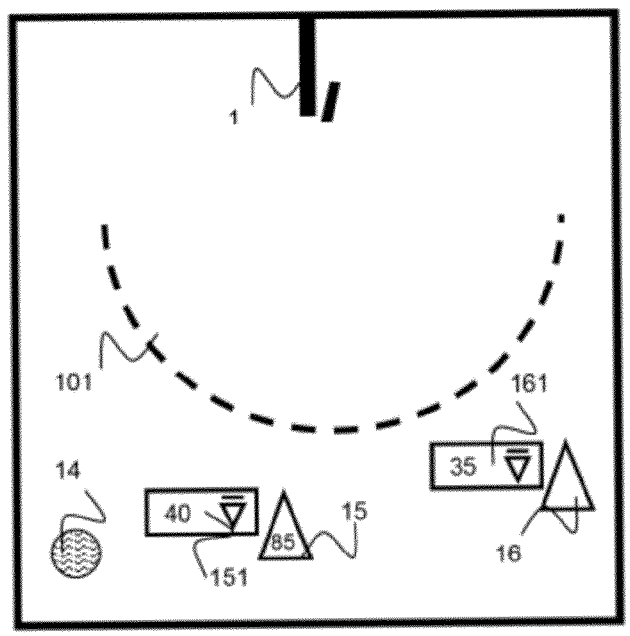
FIG. 5 represents a mode of display of the information provided by the viewing device for obstacles present in the environment of the aircraft.
Figure 6:
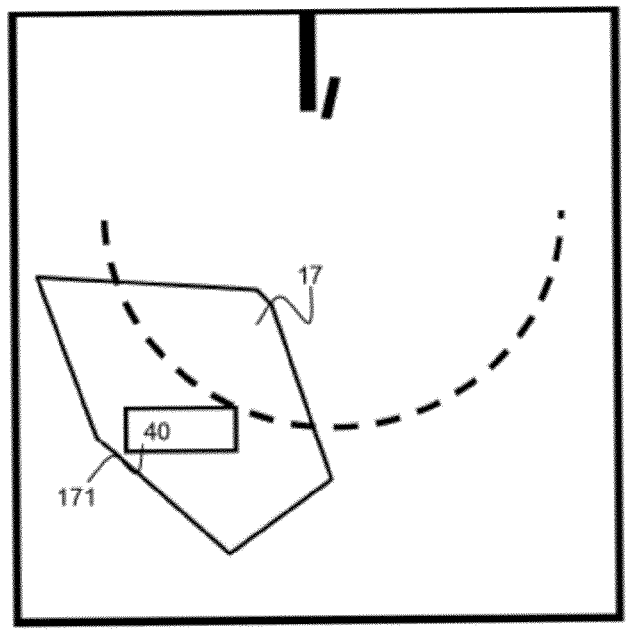
FIG. 6 represents a mode of display of the information provided by the viewing device for an obstruction of relief type.

When, for the calculation of the aircraft risk zones, the risk zones are centred on the anti-torque rotor of a helicopter, as represented by FIGS. 5 and 6, the display is limited to the environment close to the tail of the helicopter so that only the aircraft risk zones as well as the obstructions at risk are presented. The display also represents the obstructions present at the limits of the risk zones so that the pilot can anticipate the approach manoeuvre. This mode of display makes it possible to give an appreciation suited to the situation providing the crew with the means for taking the right piloting decisions.

Conversely, the higher the craft is flying, the less relevant the information returned by the sensors. In this typical case, the limits of each "safety net" are progressively reduced as and when the TAWS logic facilities are activated and the display toggles to the conventional TAWS display.

A priority level is also defined for each alert so as to manage cases of contradictory and/or simultaneous alerts. Thus, in the case of an alert of "warning" type produced by the method although an alert of "caution" type is produced by the TAWS, only the warning alert will be generated. On the other hand, the display will indeed present the warning alert zone as well as the TAWS caution alert zone.

The electronic means 3 to 6 carrying out the functions of the monitoring device can be arranged according to various modes. In a first mode, the simplest, these means receive only the data originating from the radars 2 and are linked to the cockpit viewing devices. The device is then not connected to other monitoring systems and generates only its own audible and visual alerts. The device is also not coupled to other sources of data and therefore does not anticipate the changes of attitude of the carrier.

In a second mode, the device is coupled to the avionics with the aim of increasing the relevance of the alerts. It recovers the information originating from one or more radars 2 installed on the carrier, the dynamic flight parameters 8 for the flight of the craft. The monitoring device generates only and directly its own audio and visual alerts.

In a third mode, the device is coupled to a monitoring system of TAWS type so as to provide exhaustive monitoring with respect to the location of the obstructions in relation to the craft as well as a visualization of the remaining margins. The aim here is to cover through one and the same interface the whole of the domain of operational use of the craft.

In a fourth mode, the device is integrated directly into a monitoring system of ISS/TAWS type. The alerts are managed by the complete assembly thus formed so as to ensure management and global presentation of the alerts by a single system.

The information presented includes: the surrounding obstacles and their identification parameters 31, the visualization of the remaining margins and the visualization of the zone of coverage by the radar system. In the case of coupling with a TAWS system 9, this zone decreases progressively and then disappears when the display logic toggles to an entirely TAWS-type display. The presentation of a critical zone will also be displayed around all or part of the aircraft delimiting the space required for maneuvering. This part is generally the tail of the aircraft. The criticality calculation means 4 makes it possible to detect the obstructions located inside the aircraft risk zone 10 and the said obstructions are displayed by a representation other than that of the obstructions located outside the risk zone. A green, yellow and red colour system can be used to distinguish the non-threatening obstructions from the obstructions exhibiting a potential threat and from those in the alert position. Moreover, in the case of an alert originating from the device, it is proposed that the display be augmented with the visualization of the obstructions that caused the alert.

Figure 7:
FIG. 7 illustrates the symbols that may be displayed to represent the obstructions and the associated identification parameters.

Advantageously, the display 5 and alert 6 means produce visual 51 and audible 61 alerts including a combination of the following information: criticality of the alert 41, nature of the obstruction, dimension of the obstruction, position of the obstruction and displacement of the obstruction in relation to the displacement of the aircraft 31. FIG. 5 and FIG. 6 represent an exemplary display. By way of nonlimiting example, the table in FIG. 7 proposes an example of symbols making it possible to distinguish the fixed obstacles from the mobile obstacles, to present the direction of displacement of the mobile obstacles and the evolution of the distance gap between the obstructions and the aircraft.

An additional functionality can be the display of limits of zones at risk or of zones of risk in relation to obstructions. These limits are positioned at flight margins allowing the aircraft not to penetrate the risk zones that might generate collision alerts. The obstruction 15 also contains an indication about its height.

FIG. 5 represents the display of the covered zone including the tail of the aircraft 1 augmented by the risk zone 101. The ring of this zone represents an alert zone of "caution" type while the centre of this zone is of "Warning" type. The obstruction 14 is represented as a non-threatening stationary obstruction and can be coloured green to signal this. The obstructions 15 and 16 are identified as mobile whose direction of displacement is oriented towards the aircraft. These two obstructions are represented with a different colour for example yellow or red depending on criticality. These obstacles are represented by an isosceles triangle whose tip indicates the direction of displacement. With each of these obstructions, an indication 151 and 161 is associated containing an indication about the evolution of the distance gap and the value of the distance gap. FIG. 6 represents an obstruction 17 of terrain type. The radar detection means make it possible to obtain an indication about the shape and the height 171 of the threatening terrain zone.

The audible alerts are defined according to the following format: "Type of alert", "Nature of the alert", "location of the threat" and "remaining distance". The latter parameter is optional, it depends on the criticality level of the alert. The alerts that may be produced are all the combinations of the following values.

The alerts of "Caution" type forewarn the pilot of a risk of probable collision with an obstruction or the relief. The crew has ample time to anticipate and to carry out an avoidance manoeuvre. The alerts of "Warning" type forewarn the pilot of a substantiated risk of collision with an obstruction or the relief. The pilot can still think about the way to avoid the obstruction. This avoidance is possible without necessarily changing the heading of the craft. The alerts of "Avoid" type forewarn the pilot of a substantiated risk of collision with an obstruction. The pilot no longer has time to think about the way to avoid the obstruction. Avoidance requires that the heading of the craft be changed.

The alerts of the nature "Obstruction" forewarn the pilot of a risk of collision either with the terrain or with a mobile or stationary obstacle. The alerts of the nature "obstacles" forewarn the pilot of a risk of collision with an obstacle. The nature of the obstacle can optionally be specified by comparing with characteristic identification parameters contained in a database. For example, a vehicle or a high-voltage line can be detected by means of a typical profile of identification parameters. The alerts of the nature "Terrain" forewarn the pilot of a risk of collision with the terrain. The terrain can be differentiated from an obstacle by the size and the quality of the radar echo returned supplemented optionally with a comparison with the characteristics of the obstacles that may be encountered.

The "location of threats" alert can be of "Behind" type for an obstruction situated in the opposite direction to that taken by the aircraft, "Below" for an obstruction situated under the craft, "Left" for an obstruction situated on the left side of the direction taken by the aircraft, "Right" for an obstruction situated on the right side of the direction taken by the aircraft, "Rear left" for an obstruction situated on the left in the opposite direction to that taken by the aircraft, "Rear right" for an obstruction situated on the right in the opposite direction to that taken by the aircraft. By way of example, an audible message can be: "Warning Obstruction 50 ft below".

The invention applies particularly to rescue or military helicopters required to execute low-altitude maneuvers. It also applies to any type of aircraft.

The invention claimed is:

1. A method to monitor an obstruction for an aircraft having a monitoring device, the method comprising the steps of:
   measuring location and identification parameters to locate and to identify the obstruction;
   calculating identification parameters to calculate a location and a dimension of the obstruction, a direction and a speed of the obstruction, a distance between the aircraft and the obstruction, and a variation in the distance between the aircraft and the obstruction; and
   generating audible and visual alerts to describe the location, a displacement and a criticality of the obstruction with respect to the aircraft, by calculation of an aircraft risk zone and an obstruction risk zone,
   wherein the aircraft risk zone comprises a volume disposed at a location corresponding to an anticipated location of a predetermined part of the aircraft, and the obstruction risk zone is located at a position of the obstruction and comprises the dimensions of the obstruction increased by a volume whose dimensions are dependent on a speed of approach of the obstruction and an anticipation time, and the audible and visual alerts are triggered when the obstruction risk zone penetrates the aircraft risk zone.

2. The method according to claim 1, wherein the aircraft risk zone comprises:
   a first zone comprising a volume situated at a highest criticality level risk zone; and
   a second zone comprising a ring of the aircraft risk zone,
   wherein an obstruction within the first zone has an alert criticality level that is different than an alert criticality level for an obstruction within the second zone.

3. The method according to claim 2, wherein dimensions of the first zone and the second zone are calculated as a function of a geometric description of the aircraft, of flight margins and of dynamic flight parameters of the aircraft.

4. The method according to claim 3, wherein dimensions of the first and the second zones are centered on a vertical fin of the aircraft.

5. The method according to claim 4, wherein, when the aircraft is located at low altitude and is moving at low speed, the monitoring device limits display of a monitored zone to a zone close to the aircraft.

6. The method according to claim 5, wherein a display of the obstructions and of the audible and visual alerts is triggered as a function of a duration that the obstruction risk zone is inside the aircraft risk zone.

7. The method according to claim 6, wherein a circuit is configured to detect obstructions located inside the aircraft risk zone and the obstructions inside the aircraft risk zone are displayed by a representation different than a representation of obstructions located outside the risk zone.

8. The method according to claim 7, wherein one or more indicators produce one of visual and audible alerts comprising one or more of: criticality of the alert; nature of the obstruction; dimension of the obstruction; position of the obstruction; and displacement of the obstruction in relation to a displacement of the aircraft.

9. The method according to claim 2, wherein dimensions of the first and the second zones are configurable.

10. The method according to claim 1, wherein a detector measures the location and identification parameters based on a plurality of sensors, and an identification circuit allocates to each identification parameter a confidence coefficient depending on the sensor that provided the datum, the confidence coefficient evolving as a function of instantaneous flight parameters and of measurement discrepancies between the sensors.

* * * * *